United States Patent [19]

Kopp

[11] Patent Number: 5,431,049
[45] Date of Patent: Jul. 11, 1995

[54] VEHICLE DRIVELINE BALANCING

[75] Inventor: Gary E. Kopp, Shelby Township, Mich.

[73] Assignee: Ford Motor Company, Dearborn, Mich.

[21] Appl. No.: 265,869

[22] Filed: Jun. 27, 1994

[51] Int. Cl.⁶ ............................................. G01M 1/24
[52] U.S. Cl. ........................................ 73/457; 73/458; 73/593
[58] Field of Search .............. 73/457, 458, 459, 579, 73/593

[56] References Cited

U.S. PATENT DOCUMENTS

| | | | |
|---|---|---|---|
| 4,614,506 | 9/1986 | Sakata | 464/162 |
| 4,887,989 | 12/1989 | Kerecman | 464/180 |
| 4,895,551 | 1/1990 | Fritz | 464/180 |
| 4,984,173 | 1/1991 | Imam | 73/593 |
| 5,046,361 | 9/1991 | Sandstrom | 73/460 |
| 5,203,740 | 4/1993 | Okuzumi et al. | 464/89 |

Primary Examiner—Hezron E. Williams
Assistant Examiner—Christine K. Oda
Attorney, Agent, or Firm—Donald A. Wilkinson; Roger L. May

[57] ABSTRACT

A method and system for balancing an automotive vehicle driveline (10) after it has been installed into a vehicle (8). An impact hammer and a system analyzer (36) are used to determine a frequency response function at each end of a driveshaft (16). From this, a critical frequency of rotation is determined for the driveshaft (16) for that particular model of vehicle (8) and driveline (10). Each vehicle (8) that comes off of an assembly line can now have a balance test performed on it using accelerometers (44 and 46) and a phase angle measurement. Combining the measurement with the frequency response function, the imbalance of the driveline is determined and compared to a predetermined limit to determine if correction masses need to be added. If so, a determination of the amount of mass needed and the orientation is made.

15 Claims, 3 Drawing Sheets

VEHICLE DRIVELINE BALANCING

FIELD OF THE INVENTION

The present invention relates to automotive vehicle drivelines and more particularly to an apparatus and method for balancing an automotive driveline after assembly into the vehicle.

BACKGROUND OF THE INVENTION

An out-of-balance driveline in a vehicle can cause a driveshaft, extending from the transmission to the axle to experience once per driveshaft revolution excitations. Driveline components inherently posses slight out-of-balance characteristics. Unfortunately, the driveshaft excitations create unwanted noise and vibration in the vehicle passenger compartment. To improve the vehicle tactile and audible characteristics (i.e., reduce the noise and vibration to acceptable levels) resulting from these excitations, a balancing of the vehicle driveline or its elements is needed.

Current automotive assembly lines typically do not make corrections for overall imbalances of the driveline after assembly of the vehicle. Typically, the individual components, or, at most, a pair of adjacent components of a driveline, are balanced prior to assembly into the vehicle. Several techniques are currently employed for balancing individual vehicle driveshafts and other driveline components while mounted in fixtures or balancing machines. However, the end constraints (i.e., the boundary conditions) on the driveshafts and other components will change when they are removed from the fixtures and assembled into a vehicle.

Although every effort is made to minimize the imbalance of each component separately, each will still posses small residual imbalances. Consequently, once the individual components are assembled into vehicles, there still exists the potential for addition of these small residual imbalances, which may, in total, exceed acceptable overall limits of imbalance for the particular vehicle design.

The need arises, then, for an overall balancing system that can detect out of balance drivelines after assembly into a vehicle and determine the correction needed to reduce the imbalance to an acceptable value.

Currently, equipment is available to do balancing of rotating objects, and has been used in the aerospace industry, but it would require three runs on rollers of a chassis dynamometer to accomplish the balancing of an automotive vehicle driveline. Requiring three runs adds to the time and cost of balancing a vehicle driveline, making it an expensive procedure if one desires to test each vehicle coming off of an assembly line.

The known system involves rotating a shaft at a predetermined speed, measuring the acceleration and calculating the resultant imbalance at each end of the shaft. Then, a trial weight is added near a first end of the shaft and the shaft is again rotated at the predetermined speed, again the acceleration is measured and the resultant imbalance is calculated at each end. And then, the trial weight at the first end is removed and a trial weight is added near the second end of the shaft. The shaft is rotated at the predetermined speed, and the acceleration is measured and the resultant imbalance is calculated at each end. The data are then fed into an analyzer which compares the imbalances for each of the three runs and determines influence coefficients by employing a computer program. From the influence coefficients, the amount of weight needed to be added to the first and second ends of the shaft in order to balance it can be determined. However, as stated earlier, this requires the addition and removal of trial weights as well as rotation of the shaft three separate times for each vehicle tested. This process would be time consuming and expensive to conduct for a substantial number of vehicles coming off of an assembly line, thus making it impractical.

In order to minimize the cost of balancing vehicle drivelines for substantially every assembled vehicle coming off of an assembly line, a balancing process needs to be as brief as possible. It should be brief because a significant number of the vehicles will have drivelines that are sufficiently in balance and will not need to have weights added to balance them. Also, the test needs to be non-destructive, since the vehicles are assembled and essentially ready for delivery.

The need exists, then, for an inexpensive, simple, fast and accurate method and system for balancing drivelines that will assure that vehicles in which the components, although they may be balanced individually before assembly, will be balanced and those that posses acceptable levels of overall imbalances after assembly into a vehicle do not have unnecessary balancing operations performed on them.

SUMMARY OF THE INVENTION

In its embodiments, the present invention contemplates a method of balancing a driveshaft assembled into an automotive vehicle having a transmission coupled to an engine and the driveshaft, extending between the transmission and a drive axle, having drive wheels mounted thereon. This method comprises the steps of determining a frequency response function at a first end and a frequency response function at a second end of the driveshaft, and from this determining the critical value of frequency response and lag angle for each of the frequency response functions and their corresponding critical frequencies. The method further comprises determining a first critical speed for drive wheels of the vehicle for the first end of the driveshaft, rotating the drive wheels at the first critical speed, and measuring vibrational acceleration at the first end of the driveshaft and its corresponding acceleration phase angle. From this a value of imbalance for the first end can be calculated, and also an amount of mass to add to the first end of the driveshaft to correct this imbalance and the mass phase angle at which to place the mass can be calculated.

The present invention further contemplates an automotive vehicle driveline balancing system for balancing a driveshaft having at least one piece that is assembled into an automotive vehicle having a transmission coupled to an engine and the driveshaft, extending between the transmission and a drive axle, having wheels mounted thereon. The system comprises means for determining a frequency response function at a first end and a frequency response function at a second end of the driveshaft, and means for determining the critical value of frequency response for each of the frequency response functions and their corresponding critical frequencies. The system further comprises means for determining a first critical speed for the drive wheels of the vehicle for the first end of the driveshaft, and means for rotating the drive wheels at the first critical speed. Means for measuring vibrational acceleration at the first end of the driveshaft and its corresponding acceleration phase angle as well as means for calculating a value of imbalance for the first end are employed. Further, means for calculating an amount of mass to add to the first end of the driveshaft to correct this imbalance and the mass phase angle at which to place the mass are employed.

Accordingly, an object of the present invention is to balance automotive vehicle drivelines, after assembly into the vehicle, using frequency response functions and driveline acceleration data.

It is an advantage that a driveline can be balanced after assembly into a vehicle by a system employing a simple, fast, accurate, and low cost method that will improve vehicle tactile and audible characteristics (i.e., reduce noise and vibration) resulting from once per driveshaft revolution excitations to an acceptable level.

A further advantage to the present invention, is that by using an analyzer and an impact hammer to determine and define the driveshaft boundary conditions for a particular drivetrain on a particular model of vehicle, the portion of the procedure that defines the boundary conditions need not be repeated for every similar vehicle coming off of the assembly line.

DETAILED DESCRIPTION OF THE PREFERRED EMBODIMENTS

Figure 1:
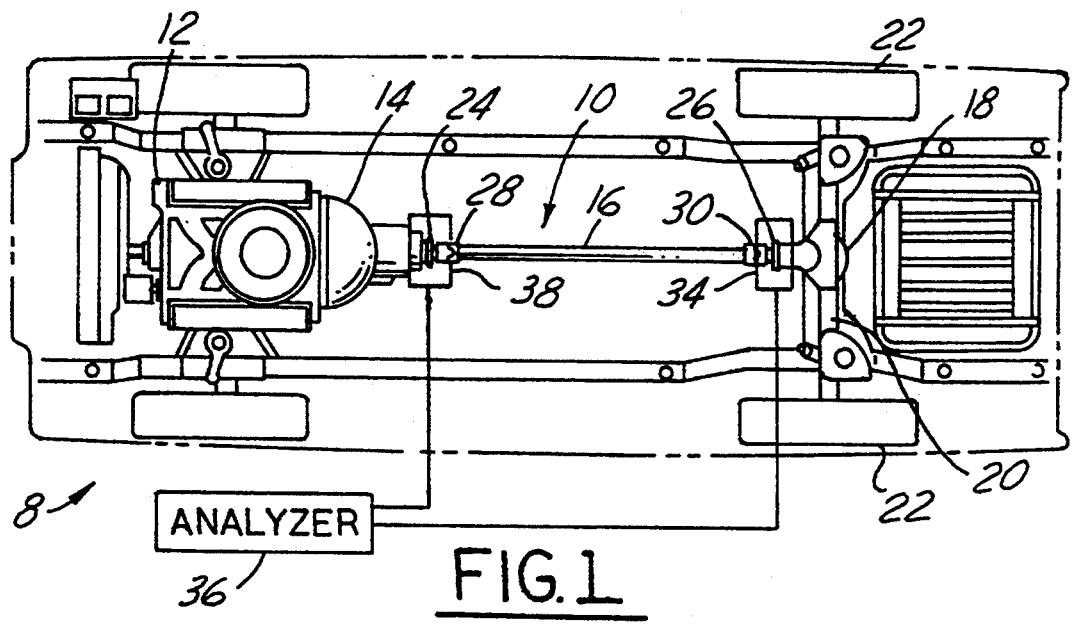
FIG. 1 is a schematic plan view of a vehicle drivetrain and frequency response function test equipment.
Figure 2:
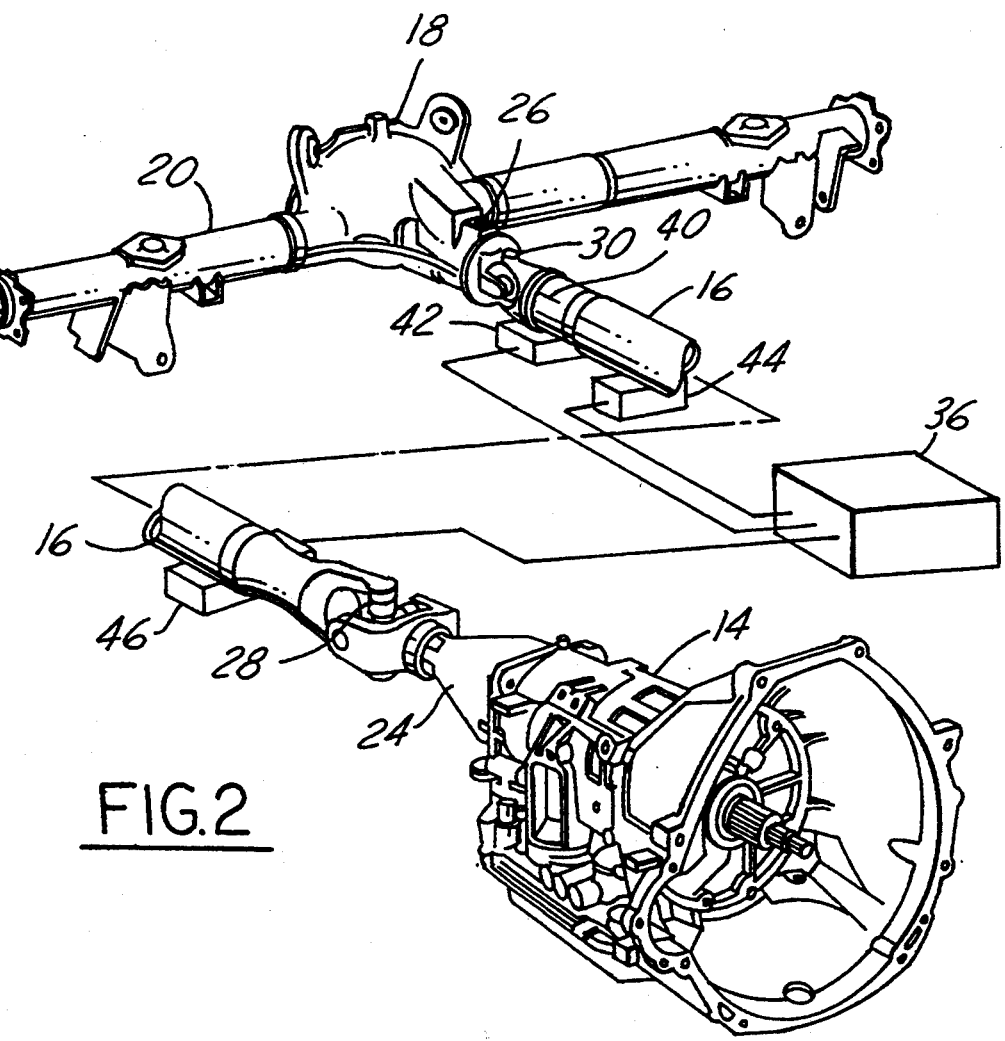
FIG. 2 is a perspective view schematically showing a portion of a vehicle driveline along with the acceleration and phase angle measuring equipment for a roll test.
Figure 3A:
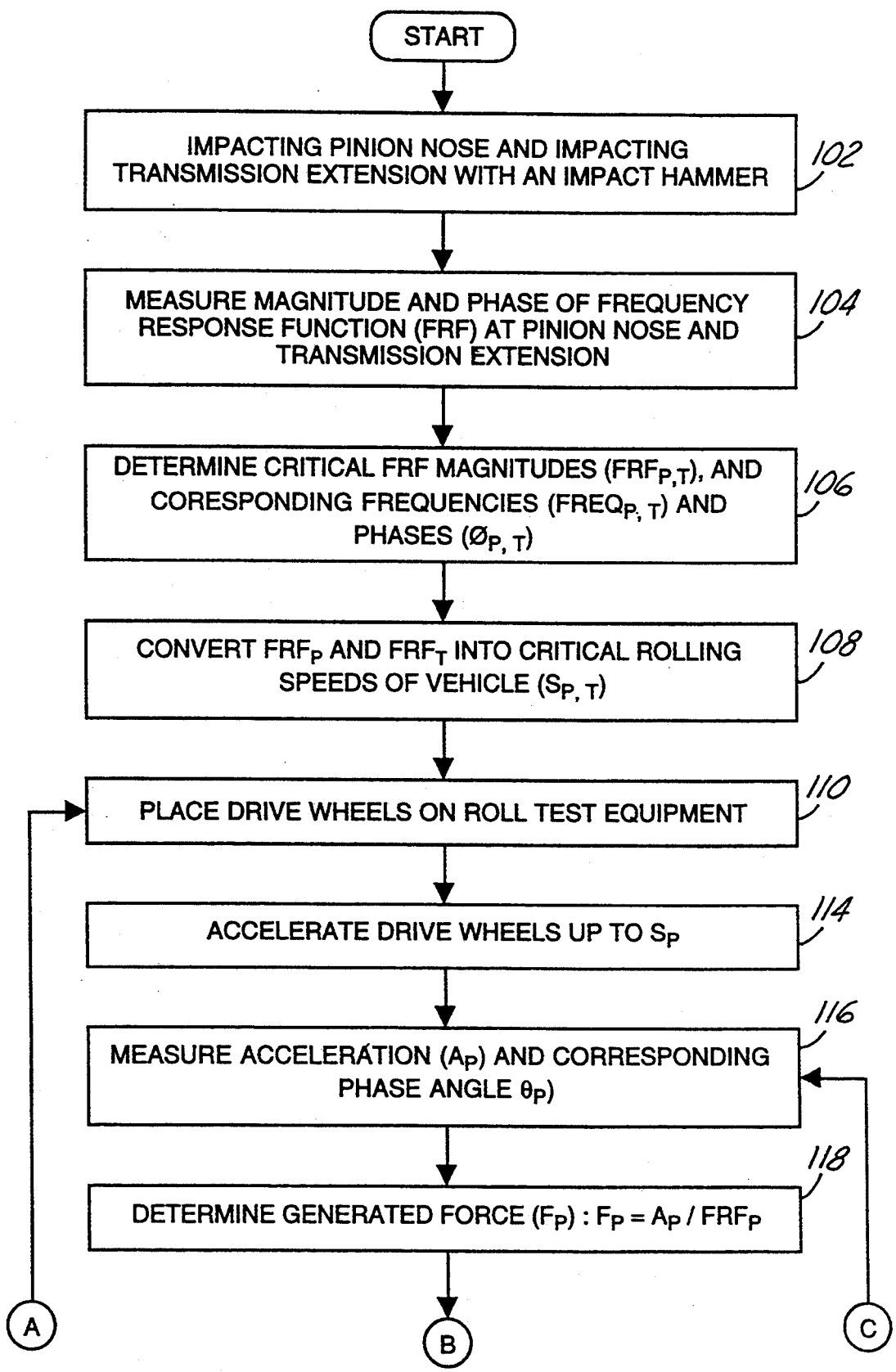
FIGS. 3A and 3B are a flow chart of the measuring and balancing process.
Figure 3B:
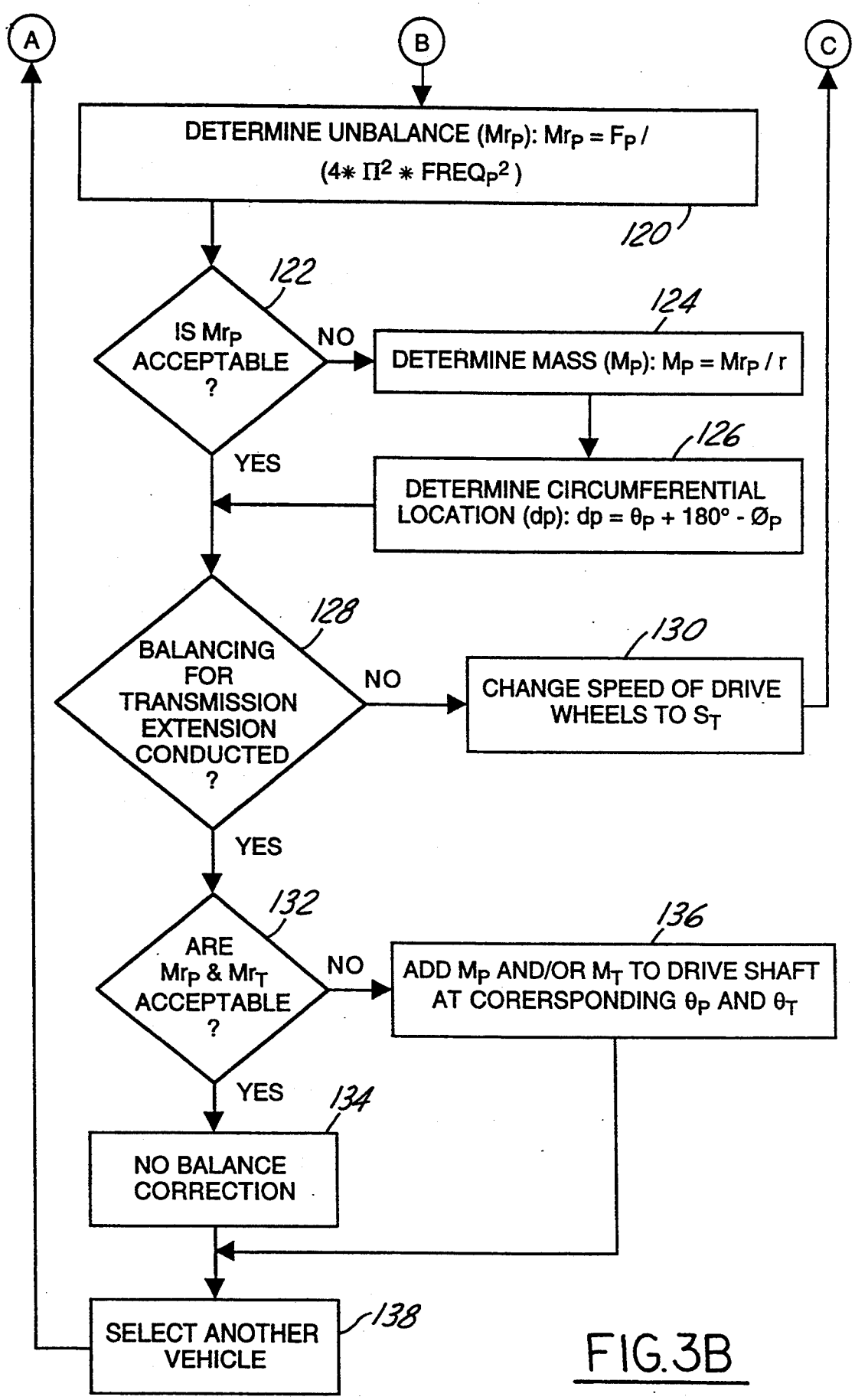

System balancing is a method used to minimize the first order forces of a vehicle driveline 10 in a fully assembled vehicle 8. By determining the magnitude and phase of the imbalance, compensating correction masses can be added to reduce the excitations perceived by vehicle occupants. This is optimally done after vehicle 8 is fully assembled in order to account for all of the imbalances that will exist in vehicle 8 when it is essentially ready to be delivered to a customer.

A typical overall powertrain for an automotive vehicle includes an engine 12, which delivers power to a transmission 14, which, in turn, drives a driveshaft assembly 16. Driveshaft assembly 16 drives a differential 18, which splits the power to each side of a rear axle 20 that turns a pair of drive wheels 22.

Driveline 10, that is being balanced, includes the components that rotate at the same frequency as driveshaft assembly 16. This method of the present invention will balance all of the components of driveline 10 at the same time to reduce the overall imbalance of these components to an acceptable level. Driveline 10 will typically include a transmission extension 24, coupled to a front U-joint 28 of driveshaft assembly 16, and a pinion nose 26 of differential 18, coupled to a rear U-joint 30 of driveshaft assembly 16. While each of the driveline components may be balanced separately before assembly, each typically will still have a small vector of force caused by a residual imbalance. On certain fully assembled vehicles, then, these small force vectors will add together in such a way that they produce an unacceptable overall imbalance in driveline 10.

While the system balancing is preferably conducted for each vehicle during a dynamic roll test on a chassis dynamometer, an initial measurement for a particular model of vehicle and associated drivetrain is first conducted to determine frequency response functions for the pinion nose and for the transmission extension, along with their corresponding critical rotational velocities. This initial measurement defines the boundary conditions for driveline 10 and establishes the critical values for each vehicle tested. The initial measurement only needs to be done once for a given model of vehicle and driveline and does not need to be done again unless a change is made to the vehicle or powertrain that will affect the vehicle dynamic response.

A first accelerometer 34, which is electrically connected to an analyzer 36, is located just below pinion nose 26, and a second accelerometer 38, which is electrically connected to analyzer 36, is located just below transmission extension 24. Analyzer 36 is preferably a model SA-610 made by Scientific Atlanta Corp. in San Diego, Calif., and employs BALANCEPRO software.

An impact hammer, not shown, strikes pinion nose 26 in the vertical direction with a predetermined amount of force, step 102, while accelerometer 30 measures the vibrational acceleration of pinion nose 26 in the vertical direction. Analyzer 36 receives a signal of the vibrational acceleration sensed by accelerometer 30 and calculates a frequency response function, step 104. Steps 102 and 104 are now repeated using accelerometer 28 mounted near transmission extension 24 with an impact hammer striking transmission extension 24 in the vertical direction. Analyzer 36 generates graphical data of the frequency response function, in units of meters per second squared per newton (m/s$^2$/N), and phase lag angle, in degrees, versus frequency, in Hertz (Hz). This data defines the resonant boundary conditions at each end of driveshaft 16.

Based upon this data, the critical speed at which to roll test this particular model of vehicle on a chassis dynamometer can be determined. The critical speed can be determined in either one of two ways, or a combination of the two. The first way is to determine from the two sets of graphical data the peak magnitude of frequency response (FRF$_P$) and its corresponding frequency (freq$_P$) and lag angle ($\Phi_P$), for the pinion nose, and the peak magnitude of frequency response (FRF$_T$) and its corresponding frequency (freq$_T$) and lag angle ($\Phi_T$) for the transmission extension, step 106. These will be the critical values for testing purposes. As used herein, subscript P corresponds to measured and calculated values associated with the end of driveshaft 16 connected to pinion nose 26, and subscript T corresponds to values associated with the end of driveshaft 16 connected to transmission extension 24.

The two corresponding frequencies will be used as the frequency of rotation of driveshaft 16 during roll testing. The variables freq$_P$ and freq$_T$ are converted into the equivalent rolling speeds (S$_{P,T}$) of drive wheels 22, step 108. These will be used as the critical speeds for roll testing the vehicle.

A second way to determined the critical speed at which to roll test the vehicle can be accomplished by mounting a pair of contact accelerometers, not shown, one each on transmission extension 24 and on pinion nose 26 and conducting a road test. During the road test, vehicle 8 will be driven at various speeds while measuring vibrational acceleration at pinion nose 26 and transmission extension 24 to determine the critical speeds ($S_{P,T}$) at which to roll test vehicles 8. This allows $S_P$ and $S_T$ to be determined while taking into account vehicle body response during actual road use.

Once $S_P$ and $S_T$ are determined by the on-road evaluations, they are recorded and converted into corresponding critical driveshaft rotational frequencies (freq$_{P,T}$) in cycles per second (Hertz). The critical magnitudes of frequency response (FRF$_{P,T}$) and lag angles ($\Phi_{P,T}$) are then determined by locating freq$_P$ and freq$_T$ on the two sets of graphical data of frequency response function versus frequency and determining the magnitude (FRF$_{P,T}$) and phase ($\Phi_{P,T}$) of the frequency response that corresponds to each value of frequency.

For each vehicle, or a certain percentage, that comes off the assembly line a roll test is now done on a chassis dynamometer using $S_P$ and $S_T$ as determined by the initial vehicle. A vehicle coming off of an assembly line (or a vehicle in other situations requiring a recheck of the balance of a driveline) is moved over to a roll test set-up, not shown, and drive wheels 22 are place on rolls, step 110. The basic chassis dynamometer equipment used for the roll test is common in the automotive industry and will not be described herein.

Each driveshaft 16 of vehicles 8 coming off of an assembly line to be tested will have a reflective paint stripe 40 painted on at a predetermined location along driveshaft 16 to align with a fiber optic pick-up 42. Fiber optic pick up 42 is electrically connected to analyzer 36. Paint stripe 40 acts as a tracking signal for the measuring equipment in order to allow for a determination of phase angle of driveshaft 16 during testing.

A pair of lasers 44 and 46, microwave accelerometers or other non-contacting probes, are mounted, one each, along driveshaft 16 adjacent to pinion nose 26 and transmission extension 24, respectively. Sensors 44 and 46 are electrically connected to analyzer 36 and measure vertical acceleration on driveshaft 16. They are located along driveshaft 16 at the approximate locations where balancing masses, not shown, will be added if needed.

Driving wheels 22 are accelerated up to the critical vehicle speed ($S_P$), step 114. Vertical acceleration measurements ($A_P$) are taken by accelerometer 44 in units of meters per second squared (m/s$^2$) and corresponding phase angles ($\theta_P$), in degrees, are measured, step 116. A generated force ($F_P$), in newtons, is determined by dividing $A_P$ by FRF$_P$, step 118.

The imbalance (Mr$_P$) is determined by the equation Mr$_P$=$F_P/(4*\pi^2*(\text{freq}_P)^2)$ in units of kilogram-meters (Kg-M), step 120. Mr$_P$ is now compared to a predetermined acceptance limit. If it is greater than the predetermined value, then the amount of correction mass will need to be determined, if it is less, this end of driveshaft is sufficiently in balance to be acceptable and will not need correction, step 122. The predetermined acceptance limit for imbalance is a value that is vehicle specific and depends upon the determination of just what level of out of balance is acceptable to drivers and passengers to provide a relatively comfortable, quite ride.

If Mr$_P$ is greater than the predetermined acceptance limit, then the amount of mass that needs to be added to this end of driveshaft 16 is determined. Mr$_P$ is divided by the driveshaft radius (r), in units of meters (m), to determine the amount of mass (M$_P$) to add in order to correct the imbalance on the pinion nose end of driveshaft 16, step 124. This mass is oriented circumferentially (d$_P$) relative to paint stripe 40 by adding 180 degrees to the phase angle ($\theta_P$) and then subtracting the lag angle ($\Phi_P$), determined by the frequency response phase data at freq$_P$; the mass is then centered there, step 126. 180 degrees is added to $\theta_P$ because analyzer 36 and accelerometer 44 are set up to locate the heavy spot on driveshaft 16. Consequently, the mass is added to the opposite side, to counterbalance the heavy spot.

The transmission extension end of driveshaft 16 is now balanced, step 128. The speed of drive wheels 22 are now changed to match the critical rolling speed ($S_T$) for the transmission end of driveshaft 16, step 130. Steps 116 to 126 are now repeated for transmission extension 24 substituting transmission end values having a subscript T for those used previously having a subscript P.

The roll test is now finished. If both Mr$_P$ and Mr$_T$ are within the acceptance limit, step 132, then no balance correction need be performed for this vehicle, step 134. However, if either Mr$_P$ or Mr$_T$ is not within the acceptance limit, then vehicle 8 will be moved over to a location where masses can be added to driveshaft 16 at the locations determined earlier, step 136. Adding masses to a driveshaft are common in the art and will not be described further herein. Another vehicle is now chosen for vehicle driveline testing, step 138, and the process is begun again at step 110.

While the present method has been shown and described for a single piece driveshaft, it also can be used for a multi-piece driveshaft. A multi-piece driveshaft would require measurement of acceleration and phase angle along the pieces near the joints between each of the individual sections of the driveshaft, just as it is measured at the ends for a one piece driveshaft. This would be done in addition to the measurements taken at each end of the overall shaft. For example, if the drive shaft is a two piece driveshaft, then measurements would be taken at each end, the same as for the one piece, and measurements would also be taken at a center bearing or joint that connects the two pieces together.

Further, with a single piece drive shaft that is employed in an automobile, when mass is added to the front and back of the driveshaft, the driveshaft is typically long enough that the masses added to each end will have minor effects on each other. The effects are typically going to be insignificant enough to ignore the effect of one mass on the other when balancing the driveshaft. However, when a double piece, or greater, drive shaft is employed in a vehicle, then each portion is a shorter length, even though the overall length will be the same. In this type of situation, the balancing masses at each end may have a significant effect on each other, and may need a coupling coefficient to account for this. Coupling coefficients are not considered new in the art of balancing a rotating object, and thus, will not be discussed further herein.

While certain embodiments of the present invention have been described in detail, those familiar with the art to which this invention relates will recognize various alternative designs and embodiments for practicing the invention as defined by the following claims.

I claim:

1. A method of balancing a driveshaft assembled into an automotive vehicle having a transmission coupled to an engine and the driveshaft, extending between the transmission and a drive axle, having drive wheels mounted thereon, comprising the steps of:
   (a) determining a frequency response function at a first end and a frequency response function at a second end of the driveshaft;
   (b) determining the critical value of frequency response and lag angle for each of the frequency response functions and their corresponding critical frequencies;

(c) determining a first critical speed for the drive wheels of the vehicle corresponding to the first end of the driveshaft;

(d) rotating the drive wheels at the first critical speed;

(e) measuring vibrational acceleration and acceleration phase angle corresponding to the vibrational acceleration at the first end of the driveshaft;

(f) calculating a value of imbalance for the first end; and (g) calculating an amount of mass to add to the first end of the driveshaft to correct the imbalance and the mass phase angle at which to place the mass.

2. A method according to claim 1 further comprising:

(h) determining a second critical speed for the drive wheels corresponding to the second end of the driveshaft;

(i) rotating the drive wheels at the second critical speed;

(j) measuring the vibrational acceleration and acceleration phase angle corresponding to the vibrational acceleration at the second end of the driveshaft;

(k) calculating a value of imbalance for the second end of the driveshaft; and (l) calculating an amount of mass to add to the second end of the driveshaft and the mass phase angle at which to place the mass.

3. A method according to claim 2 further comprising the step of repeating steps (d) through (g) and steps (i) through (l) for a plurality of vehicles.

4. A method according to claim 1 further comprising the step of repeating steps (d) through (g) for a plurality of vehicles.

5. A method according to claim 2 wherein step (c) comprises driving the vehicle on a road test and during the road test taking data to determine the first critical speed of the drive wheels; and step (h) comprises driving the vehicle on a road test and during the road test taking data to determine the second critical speed of the drive wheels.

6. A method according to claim 2 wherein step (c) comprises determining the maximum value of the frequency response function for the first end of the driveshaft and a frequency corresponding to the maximum value of the frequency response function, using the corresponding frequency as a rotational velocity of the driveshaft, and converting the rotational velocity into a corresponding first speed of the drive wheels; and step (h) comprises determining the maximum value of the frequency response function for the second end of the driveshaft and a frequency corresponding to the maximum value of the frequency response function, using the corresponding frequency as a rotational velocity of the driveshaft, and converting the rotational velocity into a corresponding second speed of the drive wheels.

7. A method according to claim 2 wherein the driveshaft includes at least two pieces, and one joint connected between each pair of the at least two pieces connecting the pair end to end, and the method further comprises:

(m) determining a frequency response function for the end of each of the at least two pieces of the driveshaft that connect to the one joint between each pair of the at least two pieces; and (n) determining the critical value of the frequency response function and lag angle for each of the frequency response functions and their corresponding critical frequencies.

8. A method according to claim 7 further comprising:

(o) determining a critical speed for the drive wheels for the end of each of the at least two pieces of the driveshaft that connect to the one joint between each pair of the at least two pieces;

(p) rotating the drive wheels at one of the critical speeds corresponding to the end of one of the at least two pieces of the driveshaft that connects to the one joint connected to this one end;

(q) measuring vibrational acceleration and acceleration phase angle corresponding to the vibrational acceleration at the end of the one of the at least two pieces corresponding to this critical speed;

(r) calculating a value of imbalance for this end of the one of the at least two pieces;

(s) calculating an amount of mass to add to this end of the one of the at least two pieces of the driveshaft to correct the imbalance and a mass phase angle at which to place the mass; and (t) repeating steps (p) through (s) for the other ends of the at least two pieces of the driveshaft connected to the one joint connected between each pair of pieces.

9. A method according to claim 1 wherein step (g) comprises:

dividing the value of imbalance into a radius of the driveshaft to determine the mass needed; and adding 180 degrees to the acceleration phase angle and subtracting the lag angle to determine the mass phase angle.

10. A method according to claim 9 wherein step (f) comprises:

determining a generated force (F) by dividing the measured vibrational acceleration by the magnitude of the frequency response function corresponding to the driveshaft rotational frequency; and determining the imbalance (Mr) by the equation $Mr = F/(4*\pi^2*(freq)^2)$, where (freq) is the rotational frequency of the driveshaft.

11. A method according to claim 10 further comprising:

(l) determining a critical speed for the drive wheels for a second end of the driveshaft;

(m) rotating the drive wheels at the critical speed;

(n) measuring the vibrational acceleration and acceleration phase angle corresponding to the vibrational acceleration at the second end of the driveshaft;

(o) determining a generated force (F) by dividing the measured vibrational acceleration by the magnitude of the frequency response function corresponding to the driveshaft rotational frequency; and (p) determining the value of imbalance for the second end of the driveshaft (Mr) by the equation $Mr = F/(4*\pi^2*(freq)^2)$, where (freq) is the rotational frequency of the driveshaft at the critical speed of the drive wheels for the second end of the driveshaft;

(q) dividing the value of imbalance for the second end of the driveshaft into the radius of the driveshaft to determine the amount of mass to add to the second end of the driveshaft; and (r) adding 180 degrees to the acceleration phase angle and subtracting the lag angle to determine the mass phase angle at which to place the mass at the second end of the driveshaft.

12. A method according to claim 11 comprising the step of repeating steps (d) through (g) and steps (i) through (r) for a plurality of vehicles.

13. An automotive vehicle driveline balancing system for balancing a driveshaft having at least one piece that is assembled into an automotive vehicle having a transmission coupled to an engine and the driveshaft, extending between the transmission and a drive axle, having drive wheels mounted thereon, the system comprising:

means for determining a frequency response function at a first end and a frequency response function at a second end of the driveshaft;

means for determining the critical value of frequency response and lag angle for each of the frequency response functions and their corresponding critical frequencies;

means for determining a first critical speed for the drive wheels of the vehicle for the first end of the driveshaft;

means for rotating the drive wheels at the first critical speed;

means for measuring vibrational acceleration and acceleration phase angle corresponding to the vibrational acceleration at the first end of the driveshaft;

means for calculating a value of imbalance for the first end; and means for calculating an amount of mass to add to the first end of the driveshaft to correct the imbalance and a mass phase angle at which to place the mass.

14. A balancing system according to claim 13 comprising:

means for determining a second critical speed for the drive wheels for the second end of the driveshaft;

means for rotating the drive wheels at the second critical speed;

means for measuring the vibrational acceleration and acceleration phase angle corresponding to the vibrational acceleration at the second end of the driveshaft;

means for calculating a value of imbalance for the second end of the driveshaft; and means for calculating an amount of mass to add to the second end of the driveshaft and a mass phase angle at which to place the mass.

15. A balancing system according to claim 14 wherein the driveshaft includes at least two pieces, and one joint connected between each pair of the at least two pieces connecting the pair end to end, the system further comprising:

means for determining a frequency response function for the end of each of the at least two pieces of the driveshaft that connect to the one joint between each pair of the at least two pieces; and means for determining the critical value of the frequency response function and lag angle for each of the frequency response functions and their corresponding critical frequencies.

* * * * *